United States Patent
Kim et al.

(10) Patent No.: US 11,631,968 B2
(45) Date of Patent: Apr. 18, 2023

(54) ARC VENTILATION SYSTEM OF DISTRIBUTING BOARD

(71) Applicant: LSIS CO., LTD., Anyang-si (KR)

(72) Inventors: Jongdoo Kim, Anyang-si (KR); Jihoon Ma, Anyang-si (KR); Sangwon Nam, Anyang-si (KR); Jaekwon Koh, Anyang-si (KR)

(73) Assignee: LS ELECTRIC CO., LTD., Anyang-si (KR)

( * ) Notice: Subject to any disclaimer, the term of this patent is extended or adjusted under 35 U.S.C. 154(b) by 279 days.

(21) Appl. No.: 16/657,258

(22) Filed: Oct. 18, 2019

(65) Prior Publication Data

US 2020/0295543 A1 Sep. 17, 2020

(30) Foreign Application Priority Data

Mar. 15, 2019 (KR) .................. 10-2019-0030092
Jun. 21, 2019 (KR) .................. 10-2019-0074326

(51) Int. Cl.
*H02B 1/56* (2006.01)

(52) U.S. Cl.
CPC ................................ *H02B 1/565* (2013.01)

(58) Field of Classification Search
CPC ..................................................... H02B 1/565
USPC ......................................................... 454/184
See application file for complete search history.

(56) References Cited

U.S. PATENT DOCUMENTS 6,410,844 B1 * 6/2002 Bruner ................ H02B 13/025
174/17 VA

FOREIGN PATENT DOCUMENTS

| | | |
|---|---|---|
| CN | 101291045 A | 10/2008 |
| CN | 101636889 A | 1/2010 |
| CN | 103975493 A | 8/2014 |
| CN | 104604053 A | 5/2015 |
| CN | 204517256 U | 7/2015 |
| CN | 105826854 A | 8/2016 |
| CN | 106030943 A | 10/2016 |
| CN | 108292830 A | 7/2018 |
| CN | 207884110 U | 9/2018 |
| CN | 109390862 A | 2/2019 |
| JP | 56101116 U * | 8/1981 |
| JP | H07-336818 A | 12/1995 |
| JP | 5602976 B1 | 10/2014 |
| JP | 6439841 B1 | 12/2018 |
| KR | 101147869 B1 | 5/2012 |

(Continued)

OTHER PUBLICATIONS

JPS56101116U English Translation (Year: 1981).*

(Continued)

*Primary Examiner* — Allen R. B. Schult
(74) *Attorney, Agent, or Firm* — K&L Gates LLP

(57) ABSTRACT

The present disclosure relates to an arc ventilation system of a distributing board, and more particularly, to an arc ventilation system of a distributing board to minimize an arc flowing forward to prevent damage. In the arc ventilation system of a distributing board in which a plurality of compartments are provided, a first compartment accommodating an electric power device which can be drawn in or out, among the plurality of compartments, comprises an arc blocking part blocking a space between the electric power device and the first compartment at an operation position of the electric power device.

7 Claims, 19 Drawing Sheets

(56) References Cited

FOREIGN PATENT DOCUMENTS

KR          10-1581350  B1     12/2015
KR          20180087507 A       8/2018

OTHER PUBLICATIONS

Korean Office Action dated May 21, 2020 issued in corresponding Korean Patent Application No. 10-2019-0030092—4 Pages.
Korean Notice of Allowance for related Korean Application No. 10-2019-0030092; action dated Sep. 16, 2020; (2 pages).
Chinese Office Action for related Chinese Application No. 201911037007.X; action dated Sep. 18, 2021; (8 pages).
Notice of Allowance for related Chinese Application No. 201911037007.X; action dated Feb. 25, 2022; (8 pages).

* cited by examiner

ARC VENTILATION SYSTEM OF DISTRIBUTING BOARD

CROSS-REFERENCE TO RELATED APPLICATION

Pursuant to 35 U.S.C. § 119(a), this application claims the benefit of earlier filing date and right of priority to Korean Application No. 10-2019-0030092, filed on Mar. 15, 2019, and Korean Application No. 10-2019-0074326, filed on Jun. 21, 2019, the contents of which are incorporated by reference herein in its entirety.

FIELD OF THE INVENTION

The present disclosure relates to an arc ventilation system of a distributing board, and more particularly, to an arc ventilation system of a distributing board to minimize an arc flowing forward to prevent damage.

BACKGROUND OF THE INVENTION

In general, a distributing board is a device used for monitoring, controlling, and protecting an electric power system. A distributing board includes various electric devices such as a circuit breaker, a current transformer, and the like, for operating or controlling a power plant and a substation or operating an electric motor or the like.

When an arc occurs due to a short circuit, ground fault, dielectric breakdown, or the like in the distributing board, a high-temperature and high-pressure arc gas occurs in the distributing board. The distributing board should be able to quickly discharge the high-temperature and high-pressure arc gas occurring due to such an accident to the outside to protect an electric power device of the distributing board and human life.

Therefore, a duct is provided in the distributing board to form a path through which the arc gas is discharged. The arc gas occurring in the distributing board may be discharged to the outside through a duct provided in the distributing board.

Such an arc discharge passage, the duct, is required to cool the arc gas or delay a discharge time in order to reduce surrounding damage due to the high-temperature gas discharged to the outside.

FIG. 1 shows a structure of a distributing board according to a related art.

A high-voltage distributing board is usually configured to have multiple stages. The distributing board 1 according to the prior art includes a transformer compartment 2 provided at a lower stage, a circuit breaker compartment 3 provided at a middle stage, a low voltage device compartment 4 provided at an upper stage, and a bus and cable compartment 5 provided at a rear stage thereof.

Meanwhile, an arc discharge compartment 6 is provided above the circuit breaker compartment 3, that is, between the low voltage device compartment 4 and the bus and cable compartment 5. A lower side and a lateral side of the arc discharge compartment 6 may be opened so that an arc that occurs in the circuit breaker compartment 3 may flow into the arc discharge compartment 6 and discharged to the outside of the distributing board.

FIGS. 2 and 3 illustrate side and front views of the circuit breaker compartment.

The circuit breaker 7 is inserted and installed in the circuit breaker compartment 3. The circuit breaker 7 includes a main circuit part (conduction part) 7a and an operation part 7b, and the operation part 7b is provided with a guard plate 7c surrounding four sides of upper, lower, and left and right sides to protect and prevent arc suitable for international protection marking.

The circuit breaker 7 is drawn into the circuit breaker compartment 3, and, at the time of an ON operation, a circuit breaker terminal 7d is coupled to a distributing board terminal 8 (specifically, a distributing board terminal in a terminal bushing) for current conduction.

An arc occurs as the circuit breaker terminal 7d is disconnected from the distributing board terminal 8 during a breaking operation of the circuit breaker 7. Of course, arcs are also generated due to accidental currents such as short circuits, ground faults, or dielectric breakdown.

Most part of the arc moves to an upper arc discharge compartment 6, but part of the arc moves to the front so that arc energy is spread toward a front door 3a.

In other words, the arc gas flows out between the low voltage device compartment 4 and the guard plate 7c of the upper portion and between a side plate 9 and the guard plate 7c and is spread forward.

In the related art, since arc energy is spread in the direction of the front door 3a so that a hinge of the front door 3a and the frame may be broken, a door handle may be broken, or a bulging phenomenon occurs in the door, or the arc energy is discharged to the front surface of the distributing board to cause a deadly consequence, having a possibility of occurrence of a secondary accident.

SUMMARY OF THE INVENTION

An aspect of the present disclosure is to provide an arc ventilation system of a distributing board in which a component of a front portion is less damaged even if an arc occurs.

Another aspect of the present disclosure is to provide an arc ventilation system of a distributing board in which discharging of arc energy in a front direction in case of an arc accident is reduced.

In an aspect, the present disclosure provides an arc ventilation system of a distributing board in which a plurality of compartments are provided, wherein a first compartment accommodating an electric power device which can be drawn in or out, among the plurality of compartments, comprises an arc blocking part blocking a space between the electric power device and the first compartment at an operation position of the electric power device.

Here, the arc blocking part may partially overlap the electric power device in a direction perpendicular to a direction in which the electric power device is drawn in or out.

In addition, the arc blocking part may be provided at an upper panel or a side panel of the first compartment.

In addition, a guard plate may be formed on upper, lower, left, and right sides of the electric power device and the arc blocking part may partially overlap the guard plate.

In addition, a second compartment and a third compartment may be provided adjacent to each other above the first compartment, the upper panel may include a first upper panel disposed below the second compartment and a second upper panel disposed below the third compartment, and a partition frame may be provided at a rear portion of the first upper panel, so that the guard plate is disposed below the partition frame at an operation position of the electric power device.

In addition, the arc blocking part may include a first extending plate provided at a front portion of the second upper panel.

In addition, a height of the front portion may be equal to a height of the partition frame.

In addition, a lower end of the first extending plate may extend to a position lower than a height of the upper plate of the guard plate.

In addition, the side panel of the first compartment is provided with a protection plate, and the protection plate may be supported by a support plate.

In addition, a second extending plate may be bent from the protection plate or the support plate, a portion of the second extending plate may partially overlap the side plate of the guard plate.

In addition, the third compartment may serve as a passage through which the arc occurring at the first compartment may be discharged.

In an aspect, the present disclosure provides an arc ventilation system of a distributing board in which a plurality of compartments are provided, wherein a first compartment accommodating an electric power device which can be drawn in or out among a plurality of compartments includes: a first cover plate provided at an enclosure of the electric power device; and a second cover plate provided at the first compartment, wherein the first cover plate and the second cover plate are arranged to overlap each other at an operation position of the electric power device.

Here, the first cover plate may have an insertion portion bent backward and the second cover plate may have an accommodating portion accommodating the insertion portion.

In addition, the insertion portion may be provided on an upper surface and a side surface of the electric power device.

In addition, a length in which the insertion portion is inserted into the accommodating portion may reach from a test position to an operation position.

In addition, the accommodating portion may have a "⊏" shape.

The first cover plate or the second cover plate may have a contact member which moves in contact with the second cover plate or the first cover plate.

In addition, the arc ventilation system may further include: a buffer member providing a restoring force to the contact member.

The contact member may include a contact plate disposed in parallel to the first cover plate or the second cover plate and a rod protruding in a direction perpendicular to the contact plate.

In addition, the first cover plate or the second cover plate may have a through hole through which the contact member is formed.

According to the arc ventilation system of a distributing board according to an embodiment of the present disclosure, the arc blocking part overlapping the guard plate or the protection plate of the circuit breaker is provided on the upper panel and the side panel of the compartment into or from which the electric power device is drawn, thereby minimizing arc energy flowing forward.

That is, most of the arc energy is guided to the arc discharge compartment above the circuit breaker compartment so that the arc may be safely discharged to the outside.

In addition, the arc blocking part is also provided at the transformer compartment, thus having an effect of reducing arc energy due to time delay or braking an arc that may occur at the transformer compartment.

According to the arc ventilation system of a distributing board according to another embodiment of the present disclosure, the cover plate disposed to overlap each other between the electric power device is provided on the upper panel and the side panel of the compartment into or from which the electric power device is drawn, thereby minimizing arc energy flowing forward.

In addition, the cover plate of the electric power device and the cover plate of the compartment are provided with the insertion portion and the accommodating portion to prevent arc energy from passing to the maximum.

That is, most of the arc energy is guided to the arc discharge compartment above the circuit breaker compartment to safely discharge the arc to the outside.

In addition, the cover plate is provided with the contact member and the buffer member so as to be completely shielded.

DETAILED DESCRIPTION OF THE INVENTION

Figure 1:
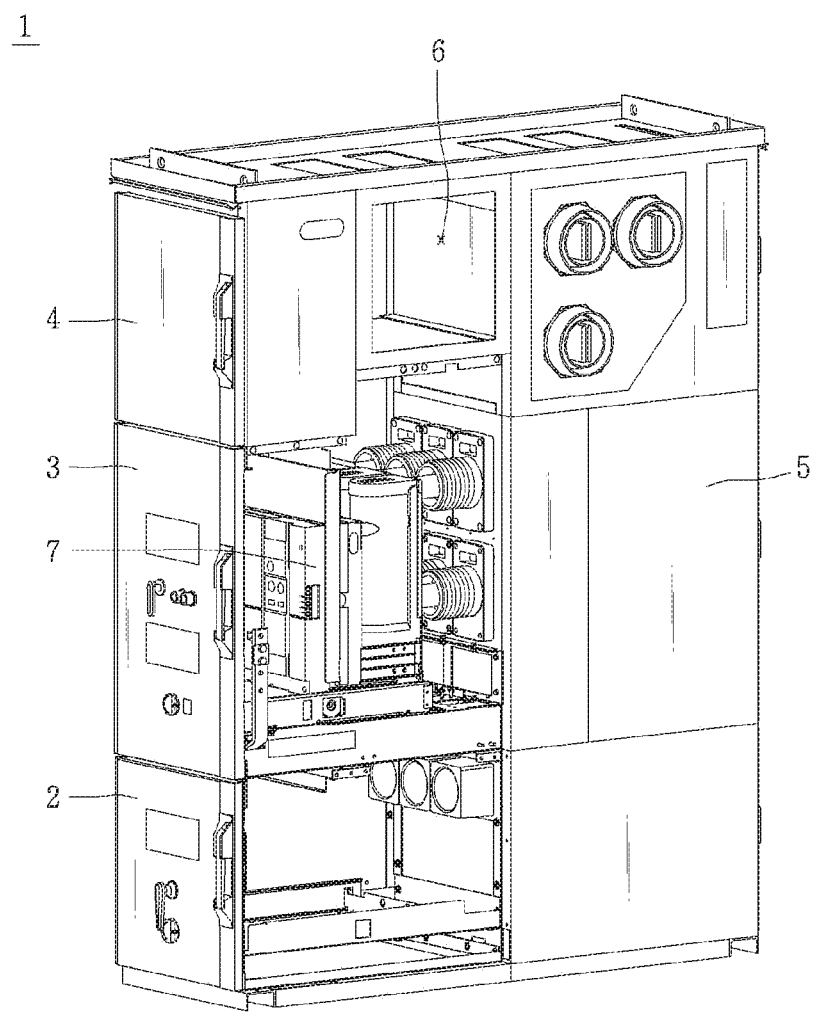
FIG. 1 is a perspective view of a distributing board according to the related art.
Figure 2:
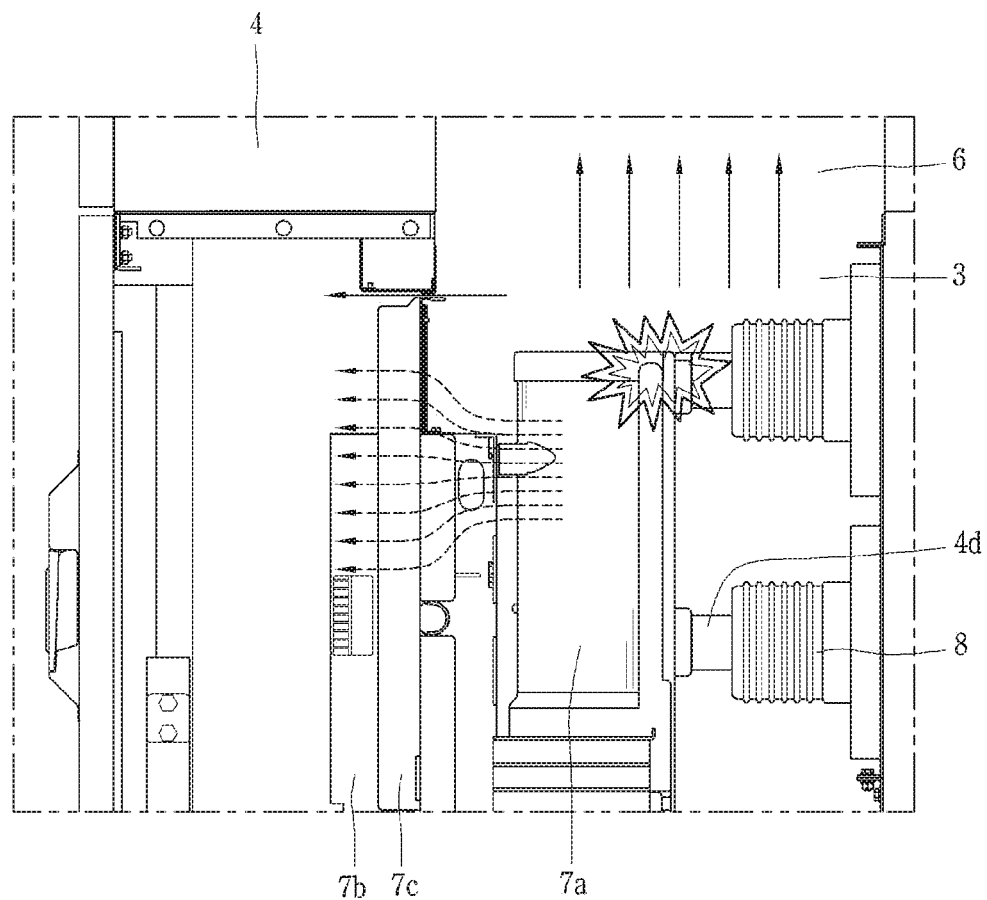
FIGS. 2 and 3 are side and front views of a circuit breaker compartment in a distributing board according to the related art.
Figure 3:
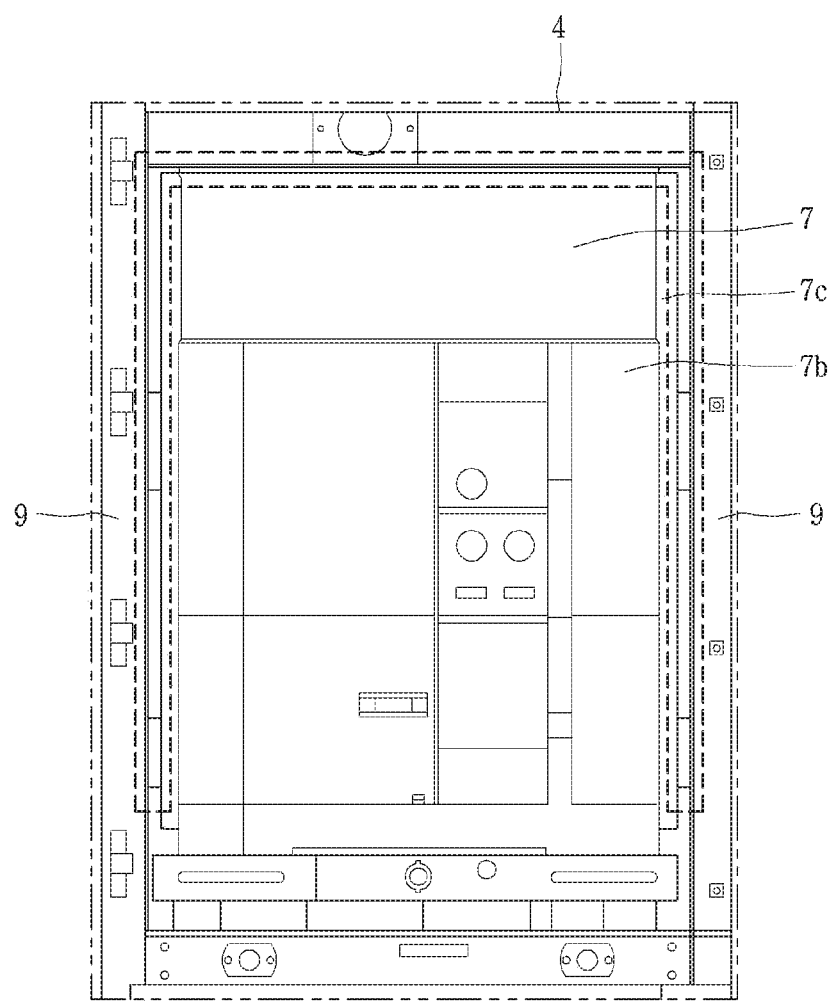

Hereinafter, preferred embodiments of the present disclosure will be described with reference to the accompanying drawings, so that a person skilled in the art can easily carry out the disclosure. It should be understood that the technical idea and scope of the present disclosure are not limited to those preferred embodiments.

An arc ventilation system of a distributing board according to each embodiment of the present disclosure will be described in detail with reference to the accompanying drawings.

In an arc ventilation system of a distributing board in which a plurality of compartments are provided according to an embodiment of the present disclosure, a first compartment 13 accommodating an electric power device which can be drawn in or out among the plurality of compartments includes an arc blocking part for blocking a space between the electric power device and the first compartment 13 at an operation position of the electric power device.

The arc ventilation system of the distributing board 10 according to an embodiment of the present disclosure includes a first compartment 13 installed at a portion of an enclosure of the distributing board; a second compartment 14 and a third compartment 16 provided above the first compartment 13; and a circuit breaker 20 installed in the first compartment 13 and provided with a guard plate 25 on upper, lower, left, and right sides of an operation part 24, wherein an arc blocking part overlapping the guard plate 25 at an operation position of the circuit breaker is provided at an upper panel 40 and a side panel 50 of the first compartment 13.

Figure 4:
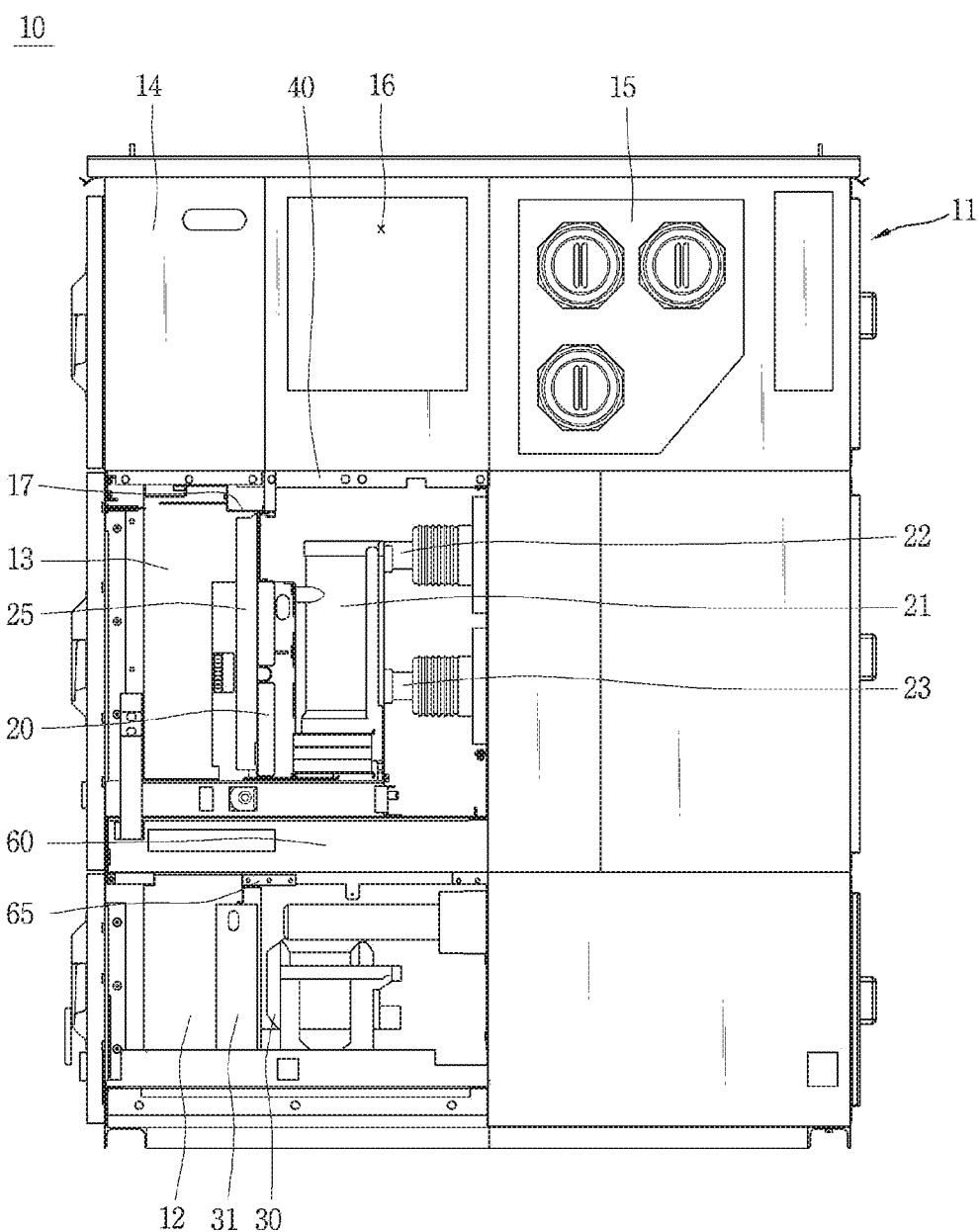
FIG. 4 is a side view of a distributing board according to an embodiment of the present disclosure.
Figure 5:
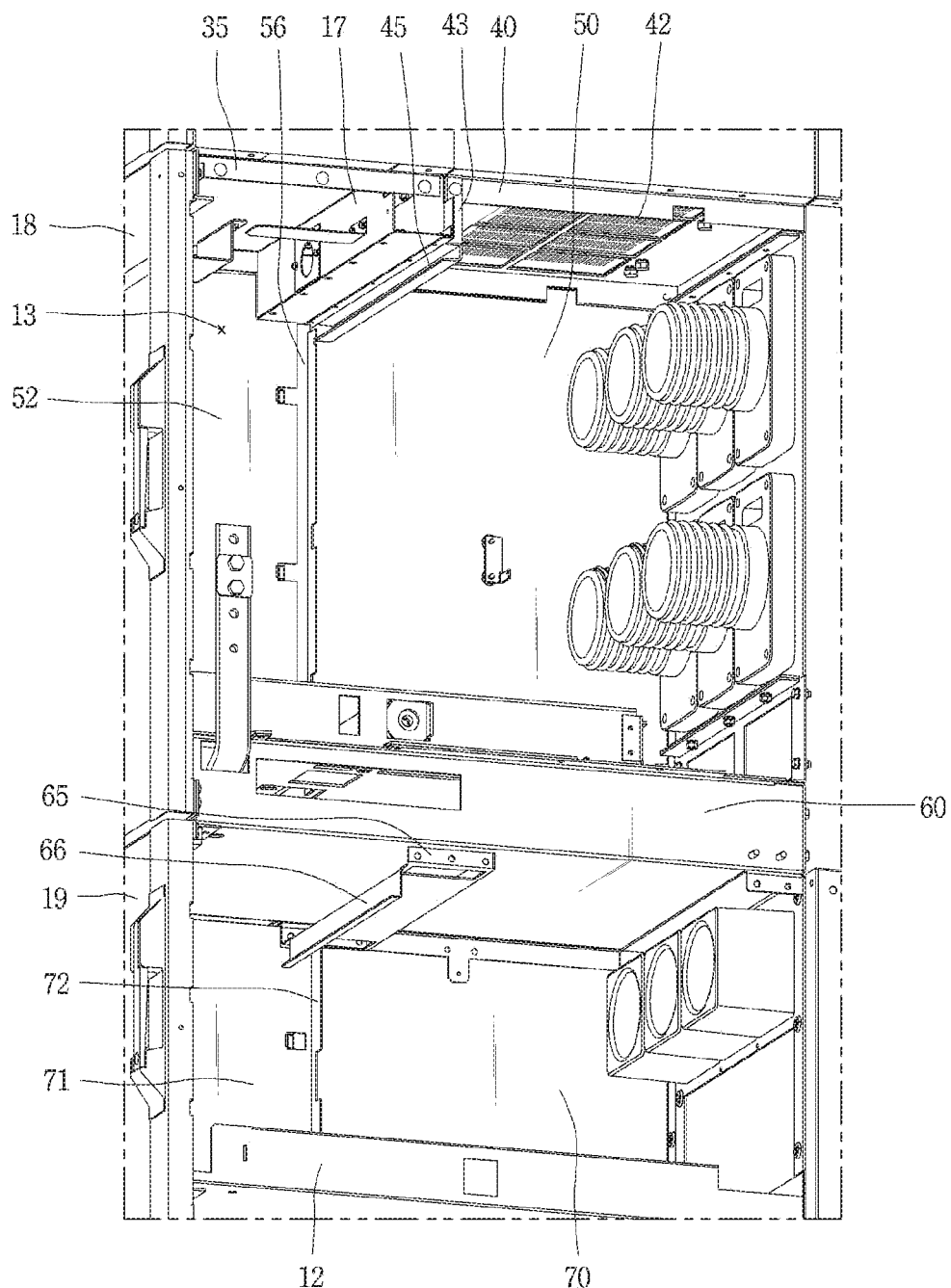
FIG. 5 is a partial perspective view of FIG. 4 in which a first compartment and a fourth compartment are shown and a circuit breaker and a transformer are removed.
Figure 6:
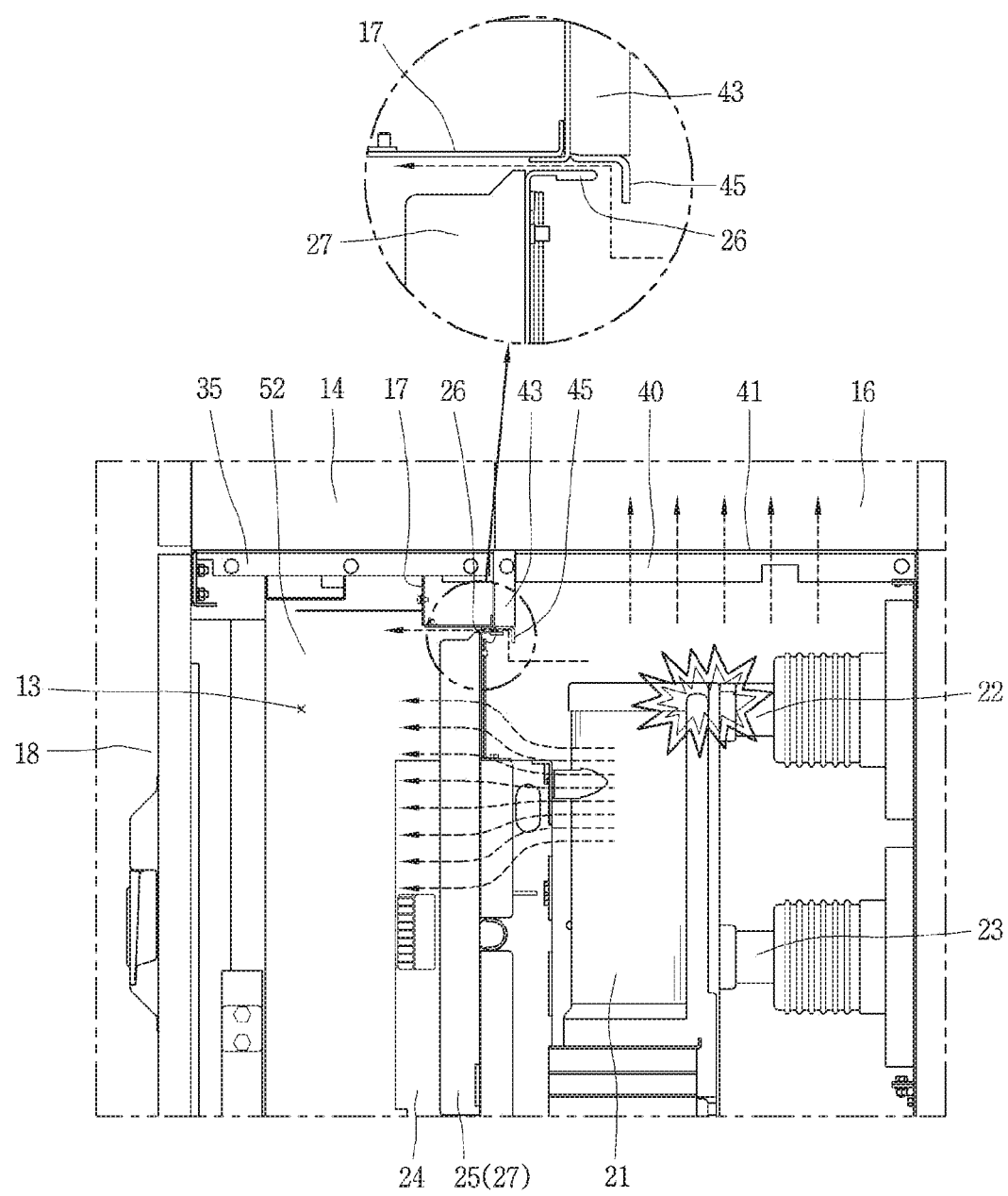
FIG. 6 is a side view of A first compartment.
Figure 7:
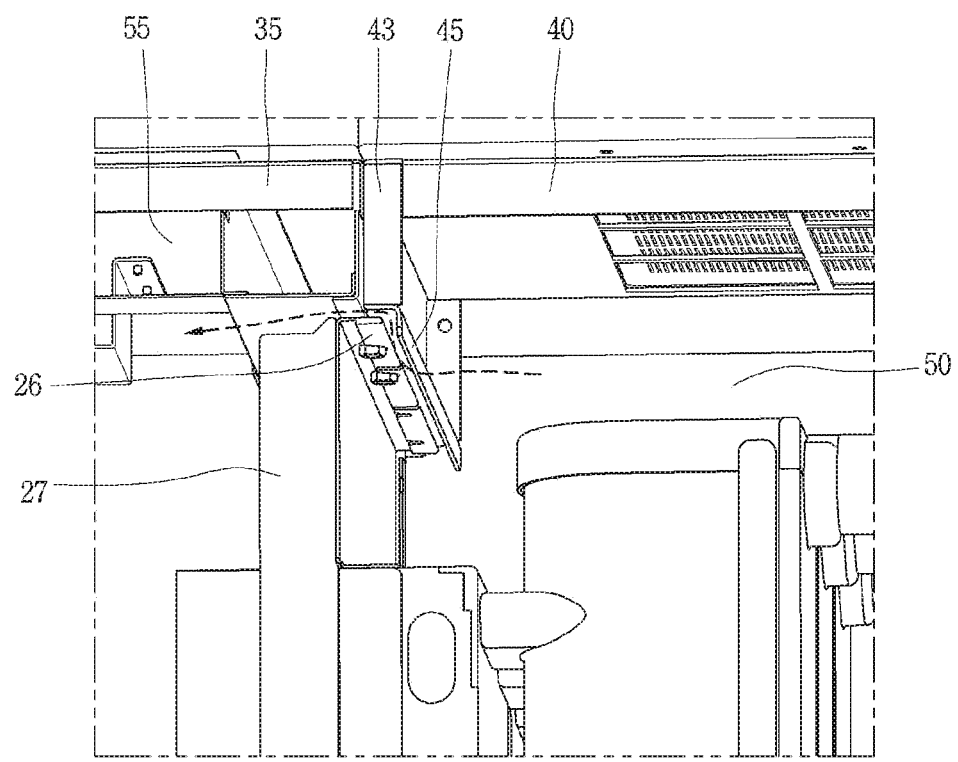
FIG. 7 is a partial perspective view in FIG. 6.

First, reference will be made to FIGS. 4 to 7. FIG. 4 is a side view of the distributing board according to an embodiment of the present disclosure, FIG. 5 is a partial perspective view of FIG. 4, showing a state of the first compartment and a fourth compartment, FIG. 6 is a side view of the first compartment, and FIG. 7 is a partial perspective view in FIG. 6.

An enclosure (cabinet) 11 of the distributing board 10 will be described first. The enclosure of the distributing board 10 according to an embodiment of the present disclosure is partitioned into a plurality of compartments. For example, the enclosure 11 of the distributing board 10 includes a first compartment (circuit breaker compartment) 13, a second compartment (low voltage device compartment) 14, a third compartment (arc discharge compartment) 16, and a fourth compartment (transformer compartment) 12, and a fifth compartment (bus and cable compartment) 15.

The high voltage distributing board is usually formed in multiple stages. The multi-stage distributing board includes compartments provided in two or more stages, respectively. In this embodiment, an enclosure of a three-stage distributing board is shown. The compartment provided in a first stage (lower stage) of the distributing board enclosure 11 is called a fourth compartment (transformer compartment) 12, and a compartment installed in a second stage (middle stage) is called a first compartment (circuit breaker compartment) 13. A withdrawable electric power device may be accommodated at each of the fourth compartment 12 and the first compartment 13. Such a device may be a circuit breaker 20 or a transformer 30. That is, a circuit breaker may be installed at the first compartment 13 and a transformer may be installed at the fourth compartment 12.

A second compartment (low voltage device compartment) 14 is provided at an upper portion of the first compartment 13. Here, the second compartment 14 is formed shorter than a length (length in front-rear direction) of the fourth compartment 12 and the first compartment 13. A low voltage device, an instrument transformer, a current transformer, or an accessory device may be installed at the second compartment 14.

A fifth compartment (bus and cable compartment) 15 is provided at the rear of the fourth compartment 12 and the first compartment 13.

A third compartment (arc discharge compartment) 16 is provided between the second compartment 14 and the bus and cable compartment 15.

The left, right, and lower sides of the third compartment 16 are fully or partially open. That is, open portions are formed on the left, right, and lower sides of the third compartment 16. Accordingly, the third compartment 16 is a passage through which an arc gas occurring at the first compartment 13 on the lower side may flow not only through the lower open portion but also flow to left and right sides.

A first flap 42 is provided on the lower surface of the third compartment 16. The first flap 42 is installed to be rotated to be opened. For example, one side of the first flap 42 is hinged. When the first flap 42 is opened, the upper surface of the first compartment 13 is opened. Thus, the first flap 42 is a discharge passage of the arc gas occurring at the first compartment 13. When the arc gas occurs at the first compartment 13, the first flap 42 is opened by the pressure of the arc gas and the arc gas flows into the third compartment 16, and thereafter, the arc gas flows laterally through left and right open portions 21 of the third compartment 16.

The second compartment 14 and the third compartment 16 may be provided above the first compartment 13.

The circuit breaker 20 may be installed at the fourth compartment of the first stage or the first compartment of the second stage. In this embodiment, the circuit breaker 20 is installed at the first compartment of the second stage by way of example.

The circuit breaker 20 includes a main circuit part (conduction part or breaking part) 21, circuit breaker terminals 22 and 23 formed on the upper and lower portions of the main circuit part 21, and an operation part 24 installed on a front surface of the main circuit part 21.

The operation part 24 is provided with the guard plate 25 on the upper and lower surfaces and the left and right surfaces. The guard plate 25 is for protection and arc blocking according to an IP rating (In this case, IP rating is a standard for dustproof and waterproof ratings for solid and liquid).

The guard plate 25 may be formed in an "L" shape. An upper plate 26 of the guard plate 25 may be bent backward, and a side plate 27 of the guard plate 25 may be bent forward.

Upper panels 35 and 40 are provided on an upper surface of the first compartment 13 (lower surfaces of the second compartment 14 and the third compartment 16). Upper and lower surfaces, front and rear surfaces, and left and right surfaces of each compartment may be formed of panels. Here, the panels may be shared in adjacent compartments. For example, a second upper panel 40 of the first compartment 13 may be shared as a lower panel of the third compartment 16. In addition, each panel may be supported by a frame.

The upper panels 35 and 40 may include a first upper panel 35 provided on a lower surface of the second compartment 14 and a second upper panel 40 provided at a lower portion of the third compartment 16.

Figure 8:
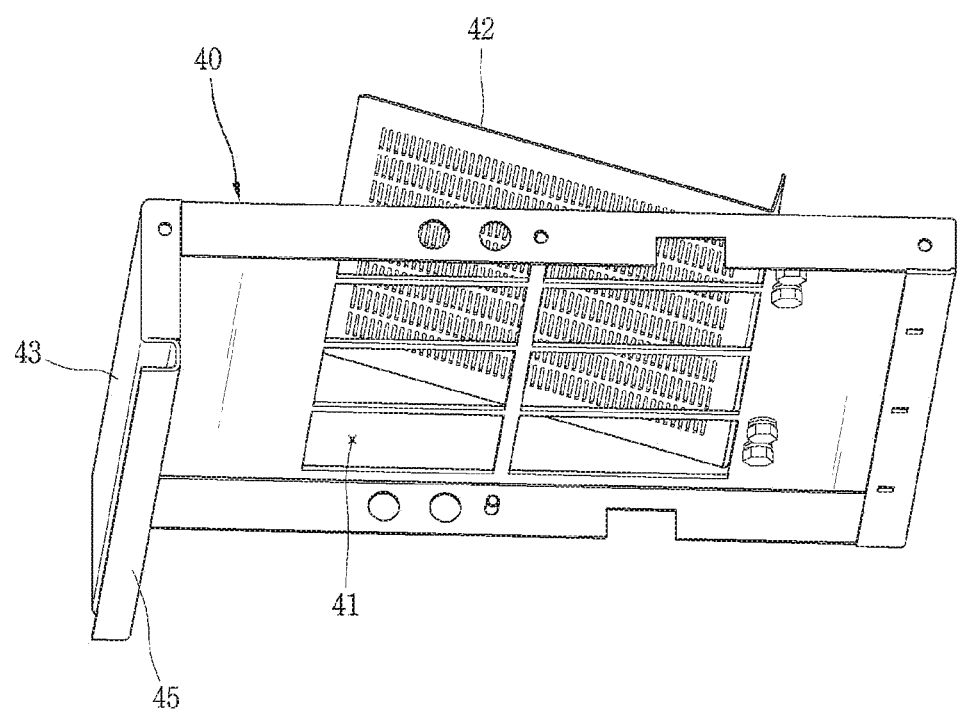
FIGS. 8 and 9 are perspective views of an upper panel and a side panel of a first compartment.

FIG. 8 is a perspective view of the second upper panel of the first compartment.

A partition frame 17 may be provided at a rear portion of the first upper panel 35. The partition frame 17 extends downward relative to the first upper panel 35.

The second upper panel 40 is provided with an opening portion 41 formed of a plurality of holes. An arc occurring when the circuit breaker 20 is blocked or an arc occurring due to an accident current moves to the upper third compartment 16 through the opening portion 41.

The opening portion 41 is provided with the first flap 42 which is installed to be opened and closed by a hinge or the like as described above. The first flap 42 is normally closed (normally energized) and is opened by a pressure of the arc when the arc occurs and the opening portion 41 is opened.

The front portion 43 of the second upper panel 40 may extend to a predetermined height (length). In this case, the extended height (length) may be equal to a height (length) of the partition frame 17 provided at the rear of the first upper panel 35. The partition frame 17 of the first upper panel 35 and the front portion 43 of the second upper panel 40 are installed adjacent.

In a state where the circuit breaker 20 is drawn in the first compartment 13 (operation position), the guard plate 25 of the circuit breaker 20 is disposed at a position where the partition frame 17 is installed (See FIG. 4). A gap between the partition frame 17 and the guard plate 25 is kept as small as possible. However, in order to avoid interference in the movement of the circuit breaker 20, a gap between the guard plate 25 and the partition frame 17 necessarily exists.

An arc blocking part is provided to block (shield) a space between the panels constituting the compartments and the electric power device accommodated therein.

The arc blocking part may be formed of a plate extending or bent on each panel.

In addition, the arc blocking part may be formed in a direction perpendicular to a direction in which the electric power device is drawn in or out, and may be provided to partially overlap the electric power device.

The front portion 43 is provided with a first extending plate 45 as an arc blocking part. The first extending plate 45 may protrude downward. Here, a lower end portion of the first extending plate 45 extends downward to be disposed lower than a height of the upper plate 26 of the guard plate 25. Accordingly, the first extending plate 45 partially overlaps the guard plate 25 when viewed from the front or rear surface. In addition, the first extending plate 45 completely covers a gap (space) between the guard plate 25 and the partition frame 17 when viewed from the front or rear surface.

The first extending plate 45 is formed in a direction perpendicular to the direction in which the electric power device is drawn in or out. Therefore, the arc flowing forward among arcs generated occurring in the circuit breaker 20 is blocked by the first extending plate 45 and flows along a bypass path changed upward or downward. Among the arcs, the arc, which is changed in flow to flow upward, flows into the third compartment 16 through the opening portion 41 and the arc flowing downward moves forward through a gap between the first extending plate 45 and the upper plate 26 of the guard plate 25.

That is, part of the arc which occurs in the circuit breaker 20 and flows forward is changed upward in direction and flows into the third compartment 16, and part of the arc is changed downward in direction and moves forward through the bypass path. The arc moving forward through the bypass path have a delay time, so pressure of the arc is reduced. Therefore, even if the arc moving forward reaches a first compartment door 18 provided in front of the first compartment 13, an influence of the arc pressure is reduced, and therefore, the first compartment door 18 and the user are not damaged.

Figure 9:
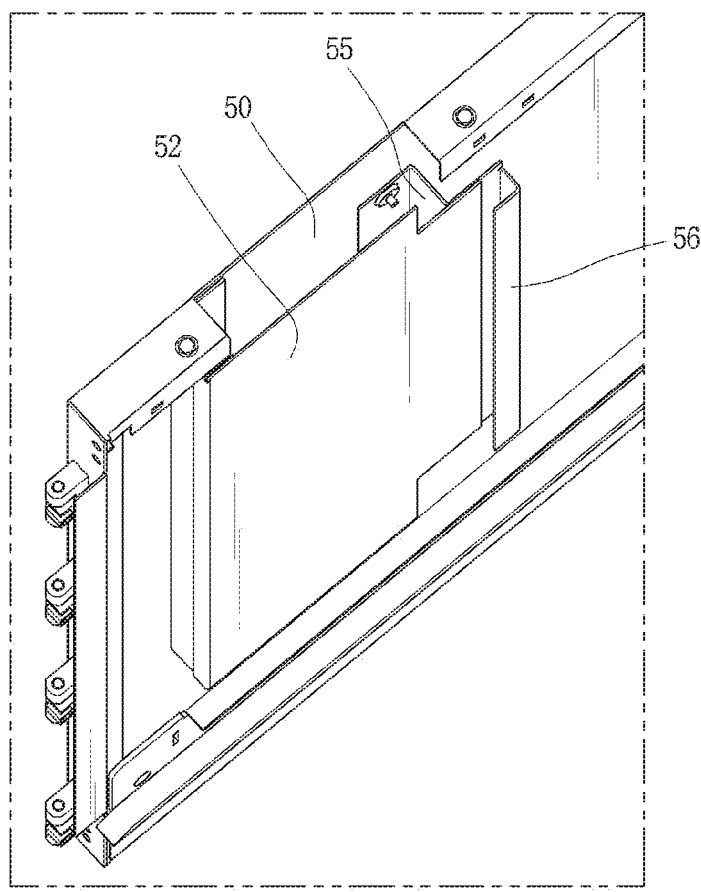

A side panel of the first compartment is shown in FIG. 9.

A protection plate 52 and a support plate 55 may be provided on an inner side of the side panel 50 of the first compartment 13. The protection plate 52 is installed at a predetermined distance from the side panel 50 by the support plate 55.

In this case, a second extending plate 56 is provided on the protection plate 52 or the support plate 55. For example, the second extending plate 56 is bent from a rear end of the support plate 55.

The second extending plate 56 extends in the left and right directions when viewed from the front. That is, the second extending plate 56 is formed in a direction perpendicular to the side panel 50 (direction perpendicular to the direction in which the electric power device is drawn in or out). Accordingly, when viewed from the front or rear side, the second extending plate 56 partially overlaps the side plate 27 of the guard plate 25. That is, when viewed from the front or rear side, the gap between the side plate 27 of the guard plate 25 and the side panel 50 (or the protection plate) is completely covered (See FIGS. 10 and 11).

Accordingly, among the arcs which occur in the circuit breaker 20 and flow forward, the arc flowing toward the side portion flows forward along the bypass path connected to the gap between the side plate 27 of the guard plate 25 and the second extending plate 56 of the support plate 55. That is, time delay occurs. Thus, the arc pressure decreases.

The arc blocking part of the embodiment described above may also be applied to the fourth compartment 12. A protection panel 65 is provided below the upper panel 60 of the fourth compartment 12 (See FIG. 5). A third extending plate 66 protrudes downward from one end of the protection panel 65. Here, a lower end of the third extending plate 66 extends to a position lower than the upper surface of the front protection plate 31 of the transformer 30. Accordingly, the third extending plate 66 partially overlaps the front protection plate 31 of the transformer 30. Thus, when viewed from the front or rear, a gap between the upper panel 60 of the fourth compartment 12 and the front protection plate 31 of the transformer 30 is closed.

A second support plate 71 is provided on the side panel 70 of the fourth compartment 12. A fourth extending plate 72 is bent from an end portion of the second support plate 71. The fourth extending plate partially overlaps a side surface of the front protection plate 31 of the transformer 30. Accordingly, when viewed from the front or rear, a gap between the side panel 70 of the fourth compartment 12 and the front protection plate 31 of the transformer 30 is closed.

According to the arc ventilation system of a distributing board according to each embodiment of the present disclosure, the arc blocking part overlapping with the guard plate or the protection plate of the circuit breaker is provided on the upper panel and the side panel of the compartment into or from which the electric power device is drawn, thereby minimizing the arc energy flowing forward.

That is, most of the arc energy is guided to the compartment into or from which the electric power device is drawn, in particular, the arc discharge compartment at the upper portion of the circuit breaker compartment, thereby safely discharge the arc to the outside.

In addition, the arc blocking part is also provided at the transformer compartment to obtain an arc energy reduction effect according to blocking or time delay for an arc occurring in the transformer compartment.

In an arc ventilation system of the distributing board 110 according to an embodiment of the present disclosure which is an arc ventilation system of a distributing board in which a plurality of compartments are provided, and a first compartment 113 accommodating an electric power device 120 which can be drawn in or out among a plurality of compartments includes a first cover plate 125 provided at an enclosure of the electric power device 120; and a second cover plate 145 provided at the first compartment 113, wherein the first cover plate 125 and the second cover plate 145 are arranged to overlap each other at an operation position of the electric power device, thereby blocking a space between the electric power device 120 and the first compartment 113.

In the arc ventilation system of the distributing board according to an embodiment of the present disclosure, which is an arc ventilation system of a distributing board in which a plurality of compartments are provided, the first compartment 113 in which the electric power device which can be drawn in or out is accommodated, among the plurality of compartments, includes an arc blocking part for blocking a space between the electric power device and the first compartment 113 at an operation position of the electric power device.

First, FIGS. 4 to 8 are referred. FIG. 4 is a side view of a distributing board according to an embodiment of the present disclosure, FIG. 5 is a partial perspective view of FIG. 4 in which a first compartment and a fourth compartment are shown, FIG. 6 is a partial perspective view of the first compartment, FIG. 7 is a perspective view of an upper panel of the first compartment, and FIG. 8 is a partial side view of the first compartment.

An enclosure (cabinet) 111 of the distributing board 110 will be described first. The enclosure of the distributing board 110 according to an embodiment of the present disclosure is partitioned into a plurality of compartments. For example, the enclosure 111 of the distributing board 110 includes a first compartment (circuit breaker compartment) 113, a second compartment (low voltage device compartment) 114, a third compartment (arc discharge compartment) 116, and a fourth compartment (transformer compartment) 112, and a fifth compartment (bus and cable compartment) 115.

The high voltage distributing board is usually formed in multiple stages. The multi-stage distributing board includes compartments provided in two or more stages, respectively. In this embodiment, an enclosure of a three-stage distributing board is shown. The compartment provided in a first stage (lower stage) of the distributing board enclosure 111 is called a fourth compartment (transformer compartment) 112, and a compartment installed in a second stage (middle stage) is called a first compartment (circuit breaker compartment) 113. Withdrawable electric power device 120 and 130 may be accommodated at each of the fourth compartment 112 and the first compartment 113. Such electric power devices 120 and 130 may be a circuit breaker or a transformer. That is, a circuit breaker may be installed at the first compartment 113 and a transformer may be installed at the fourth compartment 112.

A second compartment (low voltage device compartment) 114 is provided at an upper portion of the first compartment 113. Here, the second compartment 114 is formed shorter than a length (length in front-rear direction) of the fourth compartment 112 and the first compartment 113. A low voltage device, an instrument transformer, a current transformer, or an accessory device may be installed at the second compartment 114.

A fifth compartment (bus and cable compartment) 115 is provided at the rear of the fourth compartment 112 and the first compartment 113.

A third compartment (arc discharge compartment) 116 is provided between the second compartment 114 and the bus and cable compartment 115.

The left, right, and lower sides of the third compartment 116 are fully or partially open. That is, open portions are formed on the left, right, and lower sides of the third compartment 116. Accordingly, the third compartment 116 is a passage through which an arc gas occurring at the first compartment 113 on the lower side may flow not only through the lower open portion but also flow to left and right sides.

A first flap 142 is provided on the lower surface of the third compartment 116. The first flap 142 is installed to be rotated to be opened. For example, one side of the first flap 142 is hinged. When the first flap 142 is opened, the upper surface of the first compartment 113 is opened. Thus, the first flap 142 is a discharge passage of the arc gas occurring at the first compartment 113. When the arc gas occurs at the first compartment 113, the first flap 142 is opened by the pressure of the arc gas and the arc gas flows into the third compartment 116, and thereafter, the arc gas flows laterally through left and right open portions 121 of the third compartment 116.

The second compartment 114 and the third compartment 116 may be provided above the first compartment 113.

The electric power device 120 may be installed at the fourth compartment of the first stage or the first compartment of the second stage. In this embodiment, the electric power device 120 is installed at the first compartment of the second stage by way of example.

The electric power device 120 includes a main circuit part (conduction part or breaking part) 121, circuit breaker terminals 122 and 123 formed on the upper and lower portions of the main circuit part 121, and an operation part 124 installed on a front surface of the main circuit part 121.

The operation part 124 is provided with a first cover plate 125 on the upper and lower surfaces and the left and right surfaces. The first cover plate 125, which is also called a guard plate, is for protection and arc blocking according to an IP rating (In this case, IP rating is a standard for dustproof and waterproof ratings for solid and liquid).

The first cover plate 125 may be formed in an "L" shape and has an insertion portion. An insertion portion 126 of the first cover plate 125 is bent backward. Meanwhile, the first cover plate 125 is provided with a side plate 127, and the side plate 127 may be bent forward.

Upper panels 135 and 140 are provided on an upper surface of the first compartment 113 (lower surfaces of the second compartment 114 and the third compartment 116). Upper and lower surfaces, front and rear surfaces, and left and right surfaces of each compartment may be formed of panels. That is, each panel serves as a partition partitioning each compartment. Here, the panels may be shared in adjacent compartments. For example, a second upper panel 140 of the first compartment 113 may be shared as a lower panel of the third compartment 116. In addition, each panel may be supported by a frame.

The upper panels 135 and 140 may include a first upper panel 135 provided on a lower surface of the second compartment 114 and a second upper panel 140 provided at a lower portion of the third compartment 116.

FIG. 7 is a perspective view of the second upper panel of the first compartment.

A partition frame 117 may be provided at a rear portion of the first upper panel 135. The partition frame 117 extends downward relative to the first upper panel 135.

The second upper panel 40 is provided with an opening portion 141 formed of a plurality of holes. An arc occurring when the electric power device 120 is blocked or an arc occurring due to an accident current moves to the upper third compartment 116 through the opening portion 141.

The opening portion 141 is provided with the first flap 142 which is installed to be opened and closed by a hinge or the like as described above. The first flap 142 is normally closed (normally energized) and is opened by a pressure of the arc when the arc occurs and the opening portion 141 is opened.

The front portion 143 of the second upper panel 140 may extend to a predetermined height (length). In this case, the extended height (length) may be equal to a height (length) of the partition frame 117 provided at the rear of the first upper panel 35. The partition frame 117 of the first upper panel 35 and the front portion 143 of the second upper panel 140 are installed adjacent.

In a state where the electric power device 120 is drawn in the first compartment 113 (operation position), the first cover plate 125 of the electric power device 120 is disposed at a position where the partition frame 117 is installed (See FIGS. 4 and 6). A gap between the partition frame 117 and the first cover plate 125 is kept as small as possible. However, in order to avoid interference in the movement of the electric power device 120, a gap between the first cover plate 125 and the partition frame 117 necessarily exists.

An arc blocking part is provided to block (shield) a space between the panels constituting the compartments and the electric power device accommodated therein.

The arc blocking part may be formed of a cover plate provided to overlap the electric power device in each compartment.

The second cover plate 145 is provided at the first compartment. The second cover plate 145 may be provided on the front portion 143 or the partition frame 117. An example in which the second cover plate 145 is provided at the front portion 143 will be described.

The second cover plate 145 is provided as an arc blocking part at the front portion 143. The second cover plate 145 may protrude downward. In this case, a lower end of the second cover plate 145 extends downward to be disposed lower than a height of the insertion portion 126 of the first cover plate 125.

An accommodating portion 146 is formed at a lower end of the second cover plate 145. The accommodating portion 146 may include two flat plates extending in a horizontal direction from the lower end of the second cover plate 145. Alternatively, the accommodating portion 146 may be configured as a plate protruding in a '⊏' shape at a lower end of the second cover plate 145.

The insertion portion 126 of the first cover plate 125 is inserted into the accommodating portion 146 of the second cover plate 145 at the operation position of the electric power device 120. Accordingly, a gap (space) between the electric power device 120 and the first compartment 113, specifically, a gap between the first cover plate 125 and the partition frame 117 is completely covered.

Among the arcs that occurs in the electric power device 120, an arc flowing forward is blocked by the first cover plate 125 and the second cover plate 145 and thus the arc is changed in flow upward or downward so as to flow along a bypass path. Among the arcs, the arc changed in flow upward flows into the third compartment 116 through the opening portion 141 and the arc flowing downward is circulated and changed in direction toward the opening portion 141. Among the arcs, a small amount of arc moves forward through a gap between the accommodating portion 146 of the second cover plate 145 and the insertion portion 126 of the first cover plate 125 but a force thereof is weakened due to the change in direction several times and do not damage the distributing board or the electric power device.

That is, part of the arc which occurs in the electric power device 120 and flows forward is changed upward in direction and flows into the third compartment 116, and part of the arc is changed downward in direction and moves forward through the bypass path. The arc moving forward through the bypass path have a delay time, so pressure of the arc is reduced. Therefore, even if the arc moving forward reaches a first compartment door 118 provided in front of the first compartment 113, an influence of the arc pressure is reduced, and therefore, the first compartment door 118 and the user are not damaged.

The insertion portion 126 is provided at the first cover plate 125, the accommodating portion 146 is provided at the second cover plate 145, the first cover plate 125 and the second cover plate 145 overlap at the operation position, and the insertion portion 126 is inserted into the accommodating portion 146 by a predetermined length, thereby completely preventing outflow of the arc.

In addition, since the insertion portion 126 and the accommodating portion 146 are formed to have a predetermined length and overlap each other before the operation position of the electric power device 120 to break the arc, an accident that may occur before and after operation may be coped with. Specifically, a length l1 of the insertion portion 126 inserted into the accommodating portion 146 may correspond to a length from a test position to the operation position.

Figure 10:
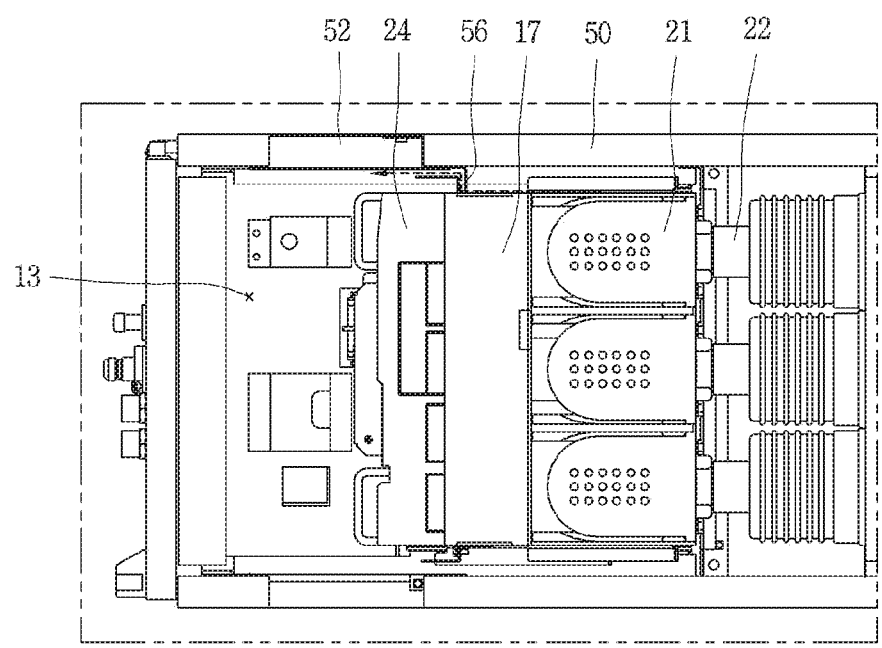
FIGS. 10 and 11 are a top plan view and a partial perspective view of a first compartment.

A side panel of the first compartment is shown in FIG. 9, and an upper perspective view in a state in which the circuit breaker is drawn in an operating state is shown in FIG. 10.

A protection plate 152 and a support plate 155 may be provided inside the side panel 150 of the first compartment 113. The protection plate 152 is installed at a predetermined distance from the side panel 150 by the support plate 155.

Here, an accommodating portion 156 is provided in the protection plate 152 or the support plate 155. For example, the accommodating portion 156 is bent at a rear end of the support plate 155. Here, the accommodating portion 156 may be formed in a '⊏' shape or have two flat plates formed in parallel like the accommodating portion 146 formed at the upper panel 140 described above. The accommodating portion 146 formed at the first cover plate 125 and the accommodating portion 156 provided at the side panel 150 may be classified as a first accommodating portion 146 and a second accommodating portion 156.

The insertion portion 128 is bent backward at the side plate 127 of the electric power device 120. The insertion portion 126 formed at the upper portion of the electric power device 120 and the insertion portion 128 formed at the side plate 127 may be classified as a first insertion portion 126 and a second insertion portion 128.

A gap between the side of the electric power device 120 and the first compartment 113 is fully covered by the second insertion portion 128 provided at the electric power device 120 and the second accommodating portion 156 provided at the side panel 150 (See FIGS. 9 and 10). Therefore, the arc flowing on the side of the electric power device 120 moves backward or upward and only an extremely small mount of arc flows between the second insertion portion 128 provided at the electric power device 120 and the second accommodating portions 156 provided at the side panel 150.

Accordingly, among the arcs which occurs at the electric power device 120 and flows forward, arc flowing to the side portion flows forward along the bypass path connected to the gap between the second insertion portion 128 of the side plate 127 and the accommodating portion 156 of the side panel 150. That is, time delay occurs. Thus, an arc pressure decreases.

The arc blocking part of the embodiment described above may also be applied to the fourth compartment 112. Although not separately illustrated, the configuration applied between the first compartment 113 and the electric power device 120 may also be applied between the second compartment 112 and the electric power device 130.

Figure 11:
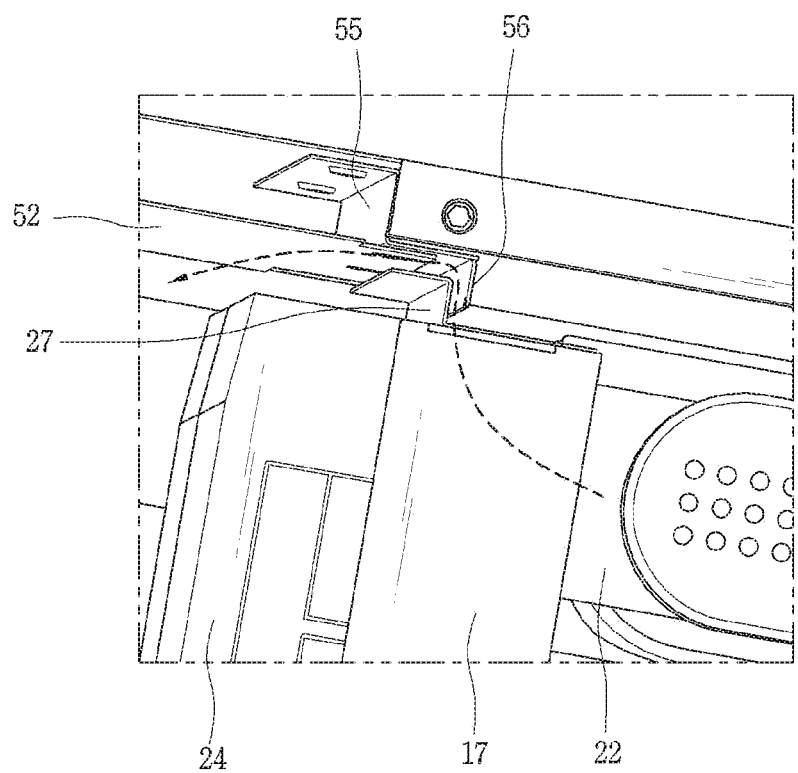
Figure 12:
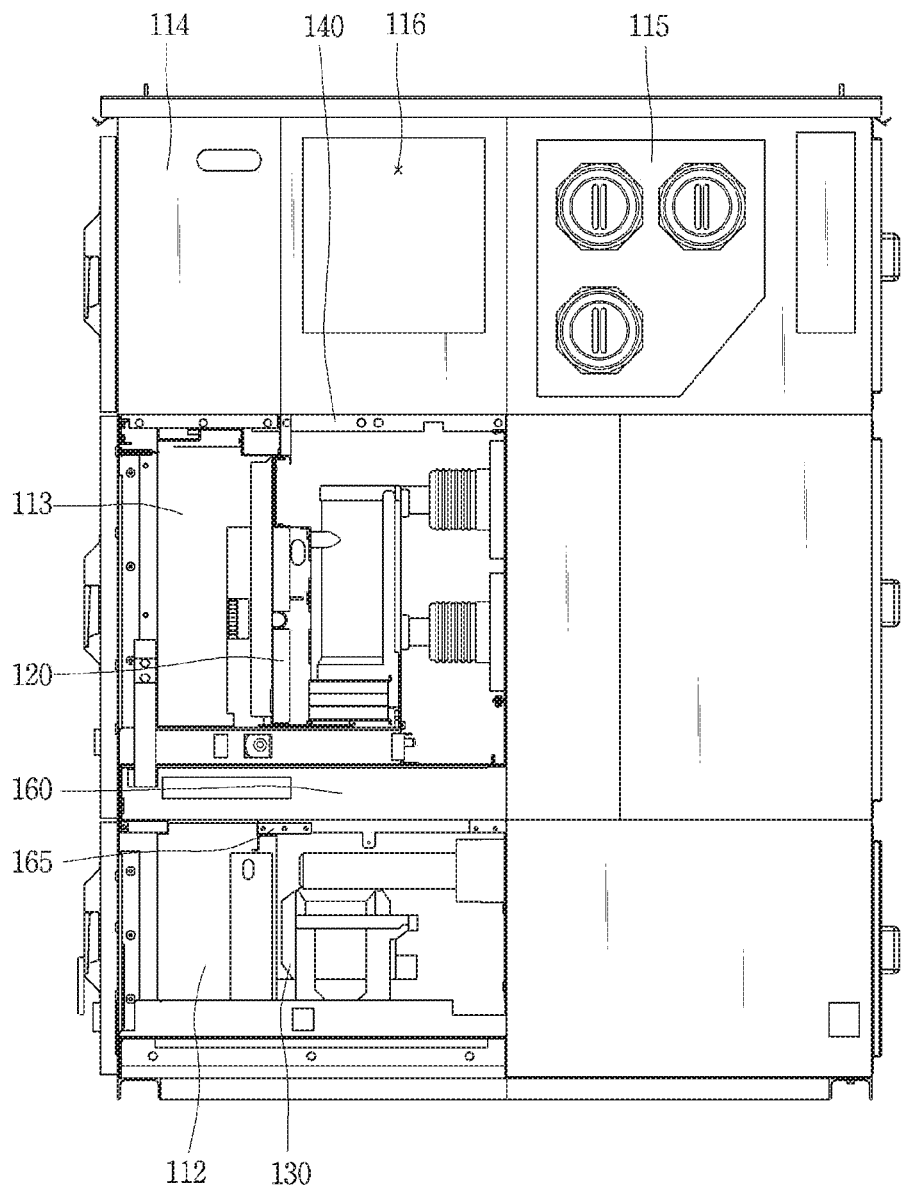
FIG. 12 is a side view of a distributing board according to another embodiment of the present disclosure.
Figure 13:
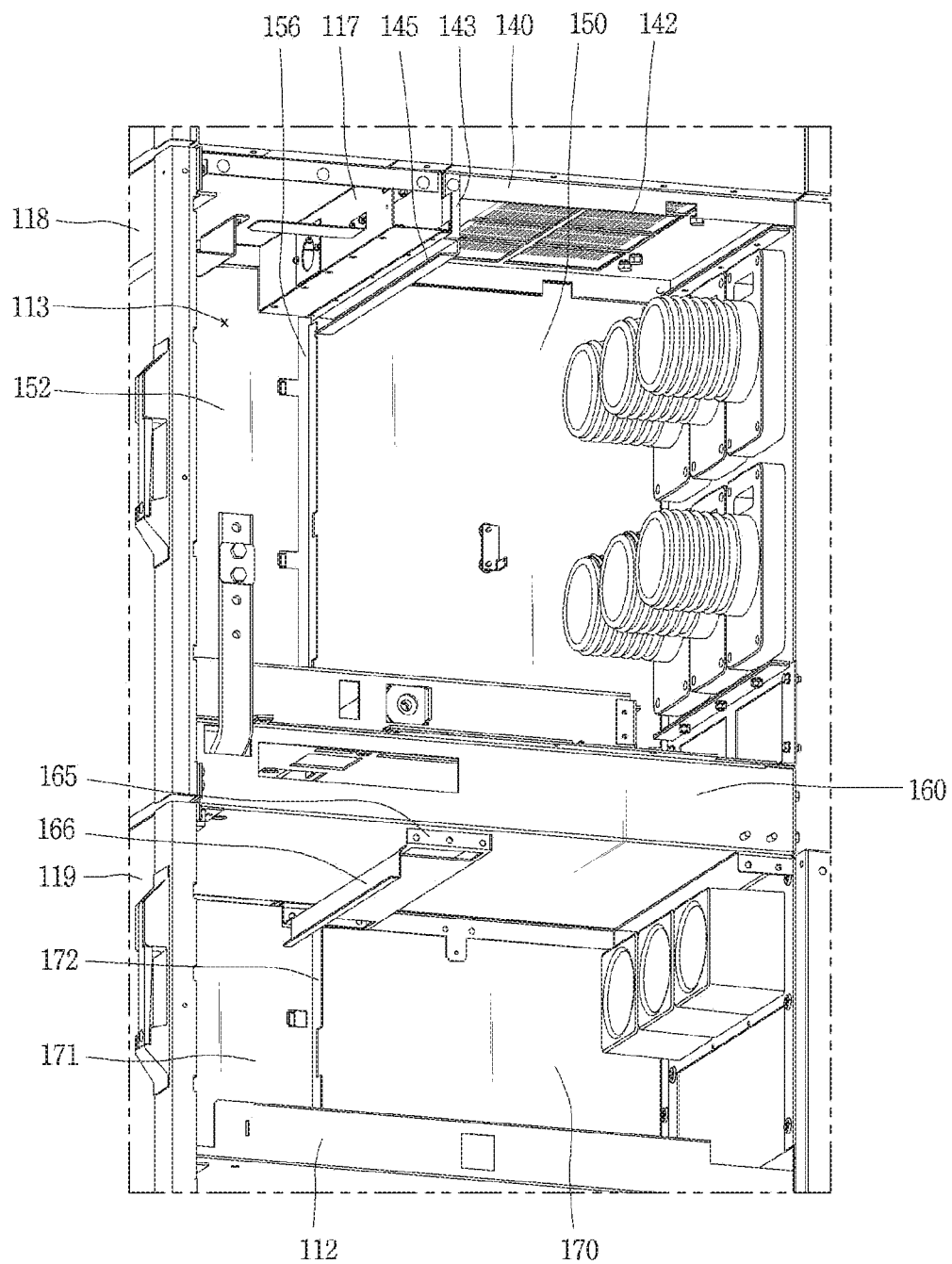
FIG. 13 is a partial perspective view of FIG. 12 in which a first compartment and a fourth compartment are shown and a circuit breaker and a transformer are removed.
Figure 14:
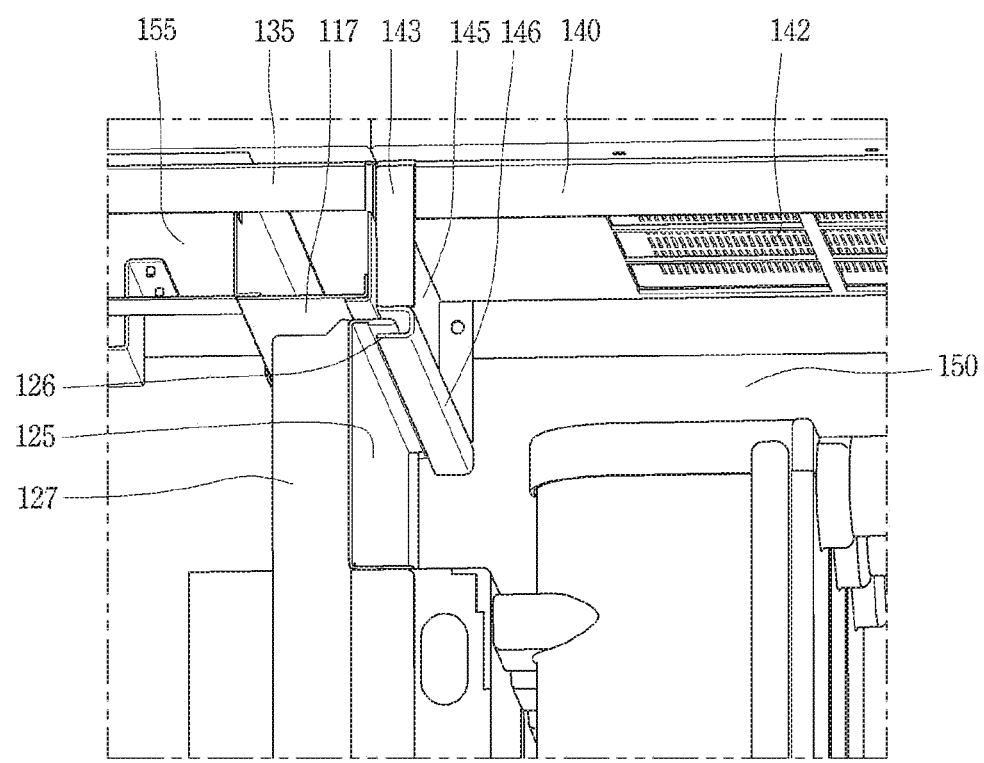
FIG. 14 is a partial perspective view of a first compartment.
Figure 15:
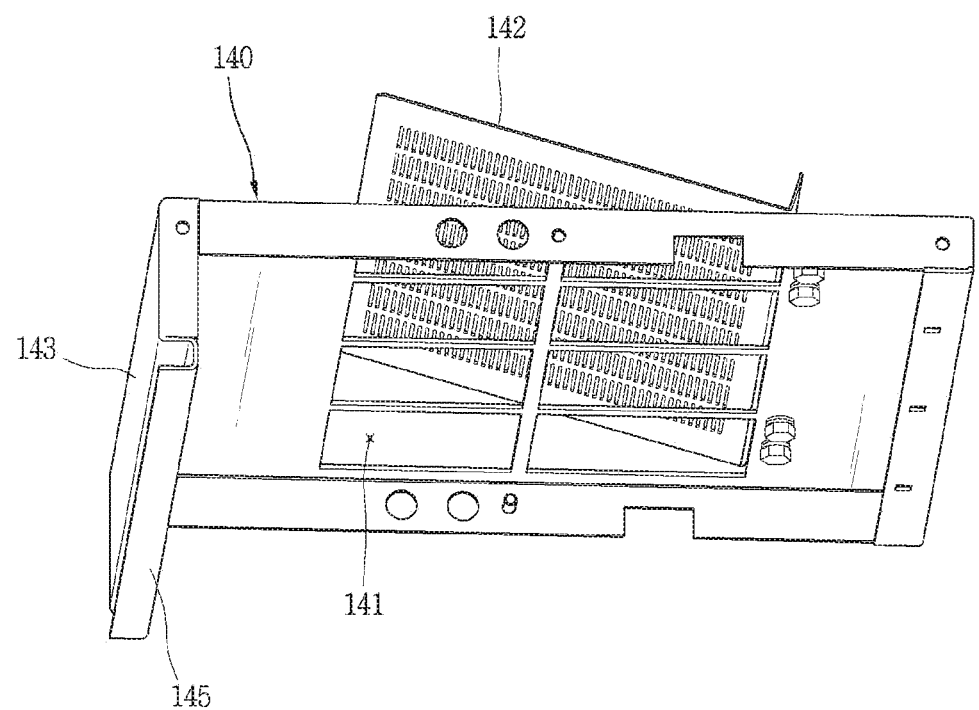
FIG. 15 is a perspective view of an upper panel of a first compartment.
Figure 16A:
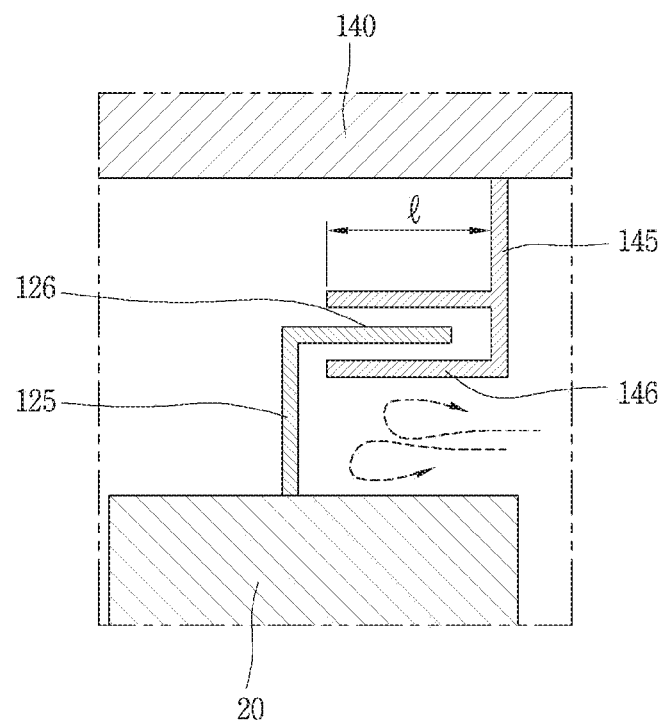
FIGS. 16A and 16B are partial side views of a first compartment.
Figure 16B:
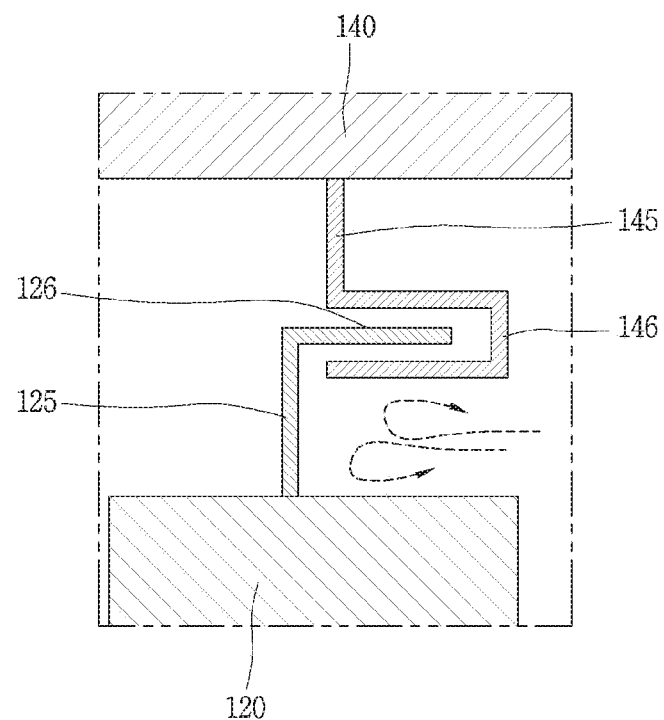
Figure 17:
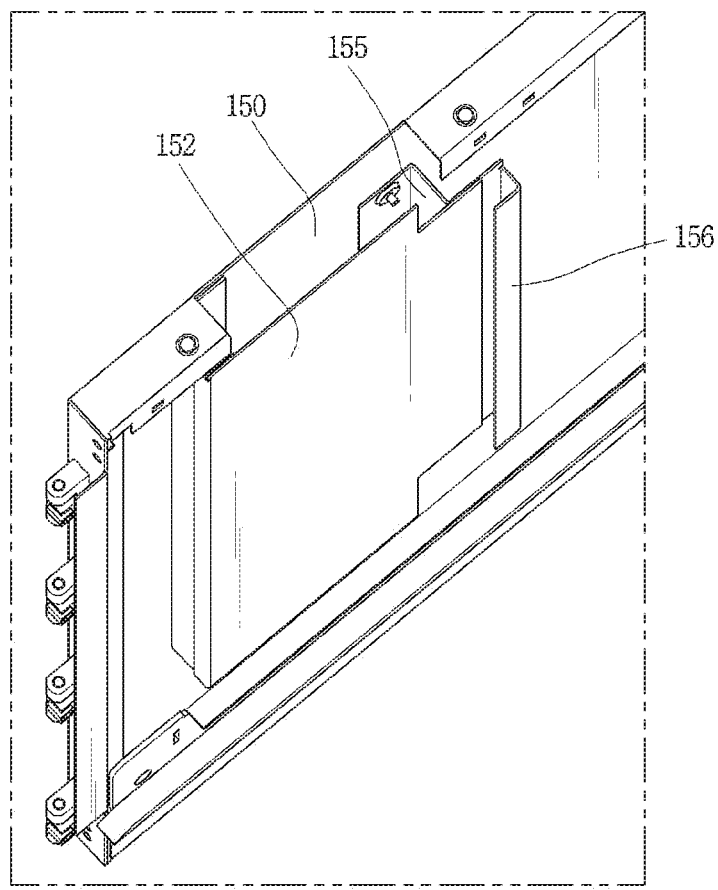
FIG. 17 is a perspective view of a side panel of a first compartment.
Figure 18:
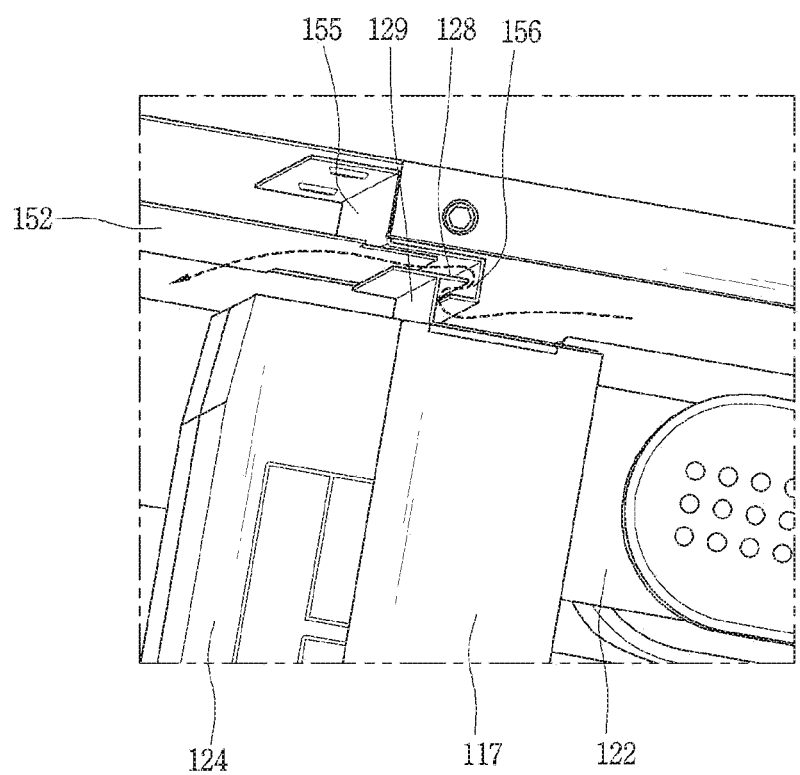
FIG. 18 is a top perspective view of a circuit breaker in an operation state in a first compartment.
Figure 19:
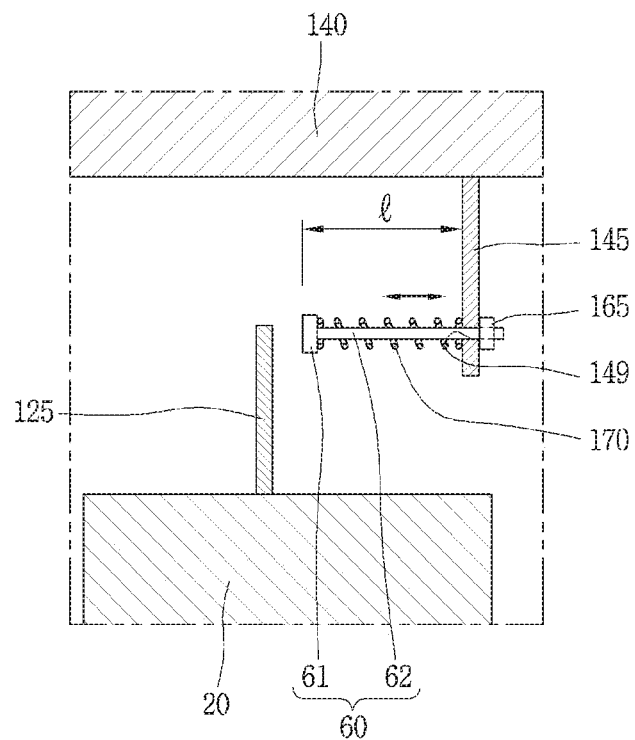
FIGS. 19 and 20 show another embodiment of FIG. 16.
Figure 20:
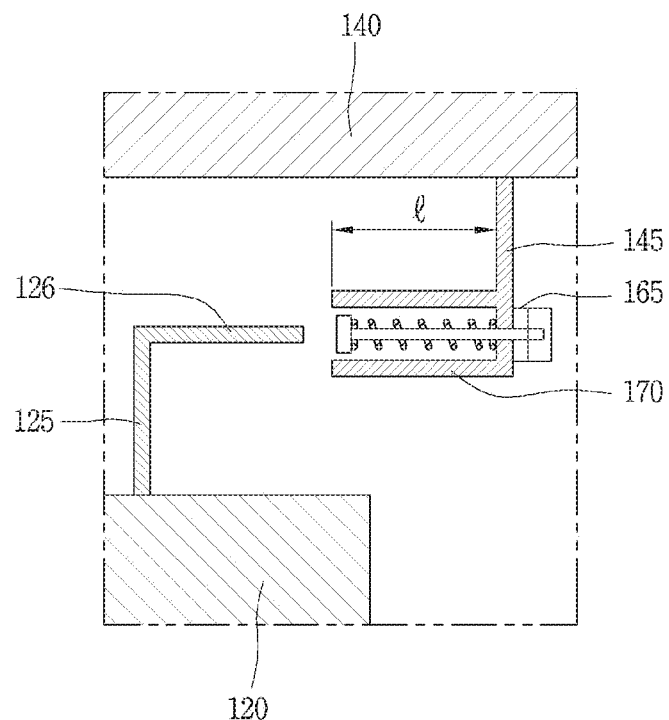

FIG. 11 shows an embodiment of an arc system of a distributing board according to another embodiment of the present disclosure.

In this embodiment, a contact member 160 is provided on the first cover plate 125 or the second cover plate 145. The contact member 160 is disposed to protrude perpendicular to the first cover plate 125 or the second cover plate 145.

The contact member 160 may include a contact plate 161 formed of a flat plate and a rod 162. For example, when the contact member 160 is provided at the second cover plate 145, the contact plate 161 contacts the first cover plate 125 and moves backward.

A through hole 149 is formed at the first cover plate 125 or the second cover plate 145 on which the contact member 160 is disposed. The rod 162 is inserted into the through hole 149 and moves.

The contact member 160 is provided with a buffer member 170. The buffer member 170 is provided between the contact member 160 and the first cover plate 125 or the second cover plate 145. For example, when the contact member 160 is provided at the second cover plate 145, the contact plate 161 contacts the first cover plate 125 and moves backward. Here, the contact member 160 moves smoothly by the buffer member 170, and when the first cover plate 125 moves forward, the contact member 160 moves forward by a restoring force of the buffer member 170. In this case, a stopper 165 may be provided at an end of the contact member 160.

According to the arc ventilation system of the distributing board according to each embodiment of the present disclosure, the cover plates disposed to overlap each other between the electric power device at the upper panel and the side panel of the compartment in which the electric power device is drawn in and out, thereby minimizing arc energy flowing forward.

In addition, the cover plate of the electric power device and the cover plate of the compartment are provided with the insertion portion and the accommodating portion, thereby preventing arc energy from passing to the maximum.

That is, most of the arc energy is guided to the arc discharge compartment above the circuit breaker compartment, thereby safely discharging the arc to the outside.

In addition, the cover plate may be provided with the contact member and the buffer member so as to be completely shielded.

While the disclosure has been shown and described with reference to the foregoing preferred embodiments thereof, it will be understood by those skilled in the art that various changes and modifications may be made without departing from the spirit and scope of the disclosure as defined by the appended claims. Therefore, the embodiments disclosed in the present disclosure are not intended to limit the scope of the present disclosure but are merely illustrative, and it should be understood that the scope of the technical idea of the present disclosure is not limited by those embodiments. That is, the scope of protection of the present disclosure should be construed according to the appended claims, and all technical ideas within the scope of equivalents thereof should be construed as being included in the scope of the present disclosure.

What is claimed is:

1. An arc ventilation system of a distributing board in which a plurality of compartments are provided, comprising:
   a first compartment accommodating an electric power device which can be drawn in or out, among the plurality of compartments, wherein the first compartment comprises an arc blocking part blocking a space between the electric power device and the first compartment at an operation position of the electric power device,
   wherein the arc blocking part partially overlaps the electric power device in a direction perpendicular to a direction in which the electric power device is drawn in or out,
   wherein the arc blocking part is provided at exclusively one of an upper panel or a side panel of the first compartment,
   wherein a guard plate is formed on upper, lower, left, and right sides of the electric power device and the arc blocking part partially overlaps the guard plate,
   wherein a first extending plate of the arc blocking part is provided at the upper panel and protrudes downward toward the guard plate,
   wherein an upper plate of the guard plate is bent from a first plane parallel to the first extending plate to a second plane not parallel to the first extending plate,
   wherein, when the electric power device is in the operation position, a gap is defined between the upper plate of the guard plate and the arc blocking part in the direction in which the electric power device is drawn in or out.

2. The arc ventilation system of claim 1, wherein
   a second compartment and a third compartment are provided adjacent to each other above the first compartment,
   the upper panel comprises a first upper panel disposed below the second compartment and a second upper panel disposed below the third compartment, and
   a partition frame is provided at a rear portion of the first upper panel, so that the guard plate is disposed below the partition frame at an operation position of the electric power device.

3. The arc ventilation system of claim 1, wherein a height of the front portion is equal to a height of the partition frame.

4. The arc ventilation system of claim 1, wherein a lower end of the first extending plate extends to a position lower than a height of an upper plate of the guard plate.

5. The arc ventilation system of claim 1, wherein the side panel of the first compartment is provided with a protection plate, and the protection plate is supported by a support plate.

6. The arc ventilation system of claim 5, wherein a second extending plate is bent from the protection plate or the support plate, a portion of the second extending plate partially overlaps a side plate of the guard plate.

7. An arc ventilation system, comprising:
   a bottom panel;
   an upper panel, disposed parallel to the bottom panel;
   an arc blocking part defined on the upper panel and projecting towards the bottom panel;
   a front panel, in contact with and perpendicular to the upper panel and the bottom panel;
   a rear panel, in contact with and perpendicular to the upper panel and the bottom panel, and parallel to the front panel;
   circuit breaker terminals defined on the rear panel; and
   a circuit breaker, including a guard plate oriented parallel to the front panel and the rear panel, the guard plate including an upper plate extending from an upper side of the guard plate proximal to the upper panel towards the rear panel and a side plate extending from a lateral side of the guard plate, adjacent and perpendicular to the upper side, from the guard plate towards the front panel, wherein the arc blocking part extends past the upper plate towards the bottom panel, and the arc blocking part and the upper plate define an arc path from a first face of the guard plate to a second face of the guard plate, opposite to the first face, that runs parallel to a first surface of the arc blocking part and a first surface of the upper plate, proximal to the upper plate, and bends to be parallel to a second surface the arc blocking part and a second surface of the upper plate, wherein the first surface of the upper plate has a smaller surface area than the second surface of the upper plate.

\* \* \* \* \*